No. 846,292. PATENTED MAR. 5, 1907.
E. F. EVANS.
ICE CUTTING MACHINE.
APPLICATION FILED JAN. 18, 1906.

Witnesses
J. Jenkins
C. N. Griesbauer

Inventor
Evan F. Evans,
by H. R. Wilson
Attorney

UNITED STATES PATENT OFFICE.

EVAN F. EVANS, OF BURLINGTON, IOWA.

ICE-CUTTING MACHINE.

No. 846,292.     Specification of Letters Patent.     Patented March 5, 1907.

Application filed January 18, 1906. Serial No. 296,699.

*To all whom it may concern:*

Be it known that I, EVAN F. EVANS, a citizen of the United States, residing at Burlington, in the county of Des Moines and State of Iowa, have invented certain new and useful Improvements in Ice-Cutting Machines; and I do declare the following to be a full, clear, and exact description of the invention, such as will enable others skilled in the art to which it appertains to make and use the same.

My invention relates to improvements in machines for cutting ice upon a river, pond, or other body of water by horse-power or any other suitable power.

The object of the invention is to provide a machine of this character which will be simple in construction, durable in use, efficient in operation, and comparatively inexpensive to manufacture.

With the above and other objects in view the invention consists of certain novel features of construction, combination, and arrangement of parts, as will be hereinafter described and claimed.

Figure 1:
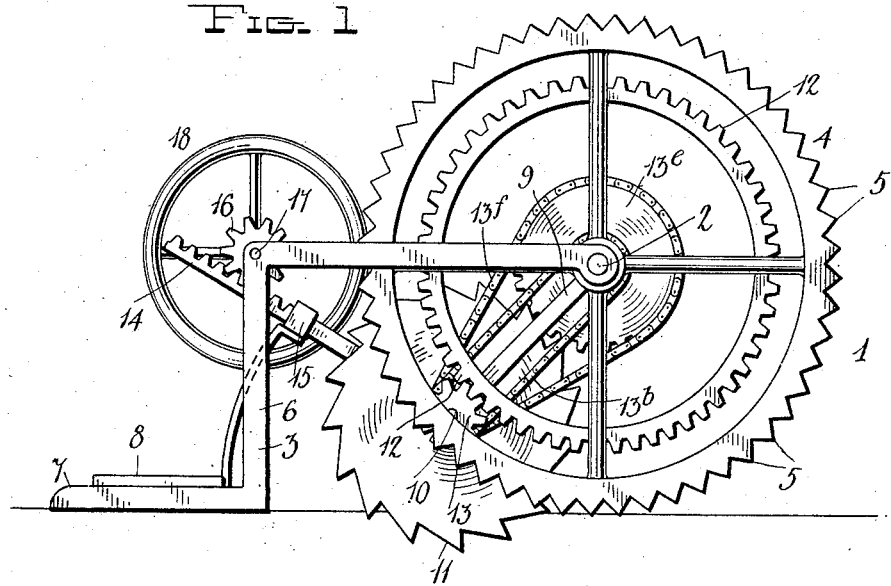
Figure 2:
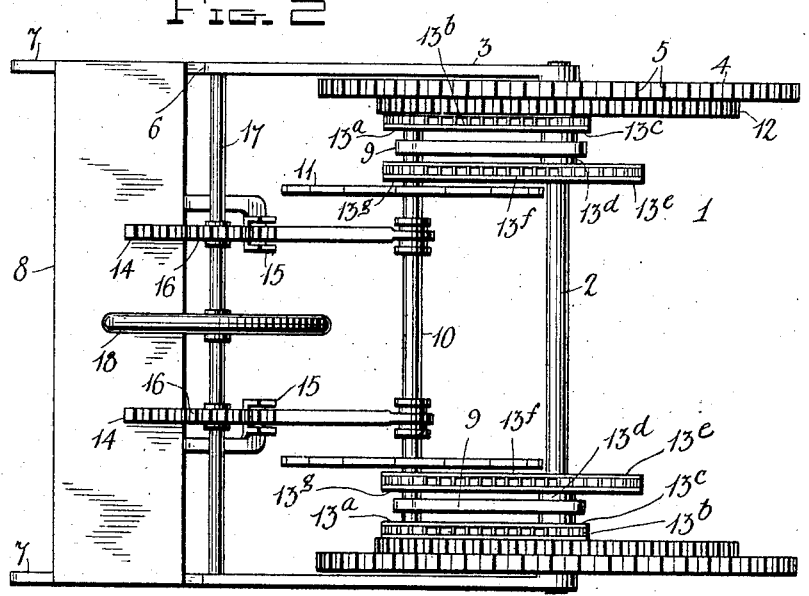

In the accompanying drawings, Figure 1 is a side elevation of an ice-cutting machine constructed in accordance with my invention, and Fig. 2 is a top plan view of the same.

Referring to the drawings by numeral, 1 denotes my improved ice-cutting machine, which is here shown as adapted for being moved over ice upon the surface of a river, pond, or the like by means of one or more horses or draft-animals. The machine comprises a main shaft or axle 2, which is journaled in a suitable frame 3, and has secured upon its end supporting and drive wheels 4. The latter have upon their peripheries spurs 5 to prevent them from slipping upon the ice when the machine is drawn forwardly by horses or by any suitable power-operated propelling mechanism.

The frame 3, as shown, consists of two substantially right-angular side sections 6, which are suitably connected and have at their lower ends rearwardly-extending runners or drags 7. The latter are connected by a transversely-extending platform 8, upon which the operator may stand. Mounted to swing from the shaft 2 are two arms or hangers 9, which have journaled in their outer ends a transverse shaft 10. Upon the latter, adjacent to its ends, are secured rotary or circular saws 11, which are adapted to cut the ice over which the machine is drawn.

These saws may be rotated by any suitable gearing arranged between the shafts 10 and 2; but I preferably secure upon the wheels 4 gear-wheels 12, which mesh with pinions 13, loosely mounted upon the shaft 10.

Formed upon or screwed to the pinions 13 are small sprocket-wheels 13$^a$, which are connected by sprocket-chains 13$^b$ to sprocket-wheels 13$^c$, secured to sleeves 13$^d$, which are loosely mounted upon the shaft or axle 2 and from which extend the hangers or arms 9. Also secured to the sleeves 13$^d$ are large sprocket-wheels 13$^e$, which are connected by sprocket-chains 13$^f$ to small sprocket-wheels 13$^g$, secured upon the shaft 10. It will be seen that by means of this gearing the shaft 10, which carries the saws, will be rapidly rotated as the machine is drawn forwardly by one or more draft-animals. The depth of the cuts made by the saws 11 may be regulated by raising and lowering the shaft 10 and its supporting-arms 9, and I preferably accomplish this by pivotally connecting to the shaft 10, adjacent to its ends, rack-bars 14, which have their upper rear ends slidably mounted in suitable guides 15. The teeth of the rack-bars 14 mesh with pinions 16, secured upon a shaft 17, which extends transversely and is mounted in bearings in the angles of the right-angular sides 6 of the frame. A suitable hand-wheel 18 is provided upon the shaft 17 to permit it to be rotated for the purpose of adjusting the saws 11. It will be seen that when the machine is drawn forwardly by one or more draft-animals, which may be connected in any suitable manner to the shaft 2 or the frame 3, the saws 11 will be rotated to cut the ice over which the machine travels.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacificing any of the advantages of this invention.

Having thus described my invention, what I claim as new, and desire to secure by Letters Patent, is—

An ice-cutting machine comprising a frame, consisting of two substantially right-angular connected side portions, a main shaft journaled in the forward ends of said side portions, supporting and drive wheels upon said shaft, runners upon the lower rear ends of said side portions of the frame, a platform connecting said runners, swinging arms upon said main shaft, a saw-shaft journaled in said arms, a circular saw upon said saw-shaft, a sprocket-wheel fixed to said saw-shaft, a sleeve upon said main shaft, a sprocket-wheel fixed to said sleeve, a sprocket-chain connecting said sprocket-wheels, a second sprocket-wheel fixed to said sleeve, a sprocket-wheel loose upon said saw-shaft, a sprocket-chain connecting the latter and said second sprocket-wheel upon said sleeve, a pinion fixed to said loose sprocket-wheel and loose upon said saw-shaft, a gear fixed to one of said driving-wheels and in mesh with said pinion, an operating-shaft journaled in the angles of the side portions of said frame, a pinion upon the last-mentioned shaft, a guide, rack-bars pivotally connected to said saw-carrying shaft, slidably mounted in said guide and engaged in said pinion, and a hand-wheel upon said operating-shaft, substantially as described.

In testimony whereof I have hereunto set my hand in presence of two subscribing witnesses.

EVAN F. EVANS.

Witnesses:
C. L. POOR,
BEN P. POOR.